R. K. GRAY.
AUTOMOBILE TIRE LOCK.
APPLICATION FILED NOV. 3, 1919.
1,348,169.
Patented Aug. 3, 1920.
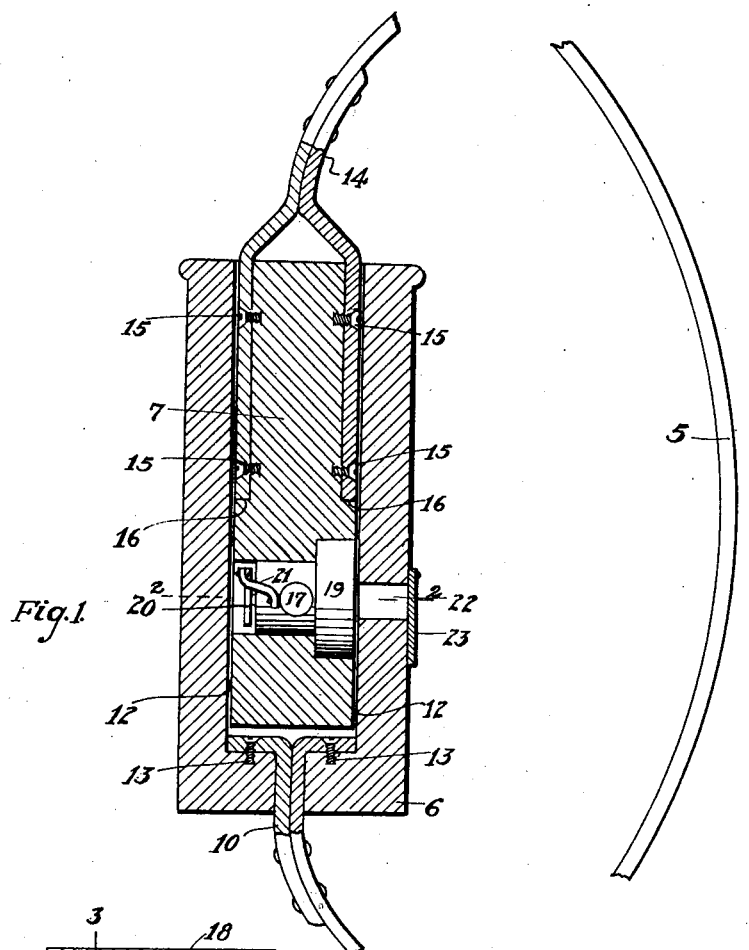
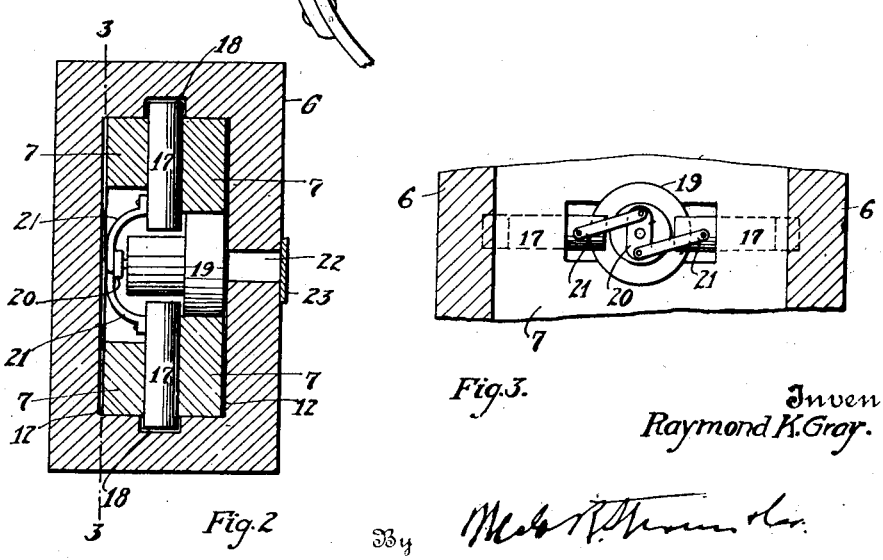
Fig.2
Fig.3
Inventor
Raymond K. Gray.
By
Attorneys

UNITED STATES PATENT OFFICE.

RAYMOND K. GRAY, OF CHICAGO, ILLINOIS, ASSIGNOR, BY DIRECT AND MESNE ASSIGNMENTS, TO THE GRAYNIE CORPORATION, OF CHICAGO, ILLINOIS, A CORPORATION OF ILLINOIS.

AUTOMOBILE-TIRE LOCK.

1,348,169.        Specification of Letters Patent.      Patented Aug. 3, 1920.

Application filed November 3, 1919. Serial No. 335,397.

*To all whom it may concern:*

Be it known that I, RAYMOND K. GRAY, a citizen of the United States, residing at Chicago, in the county of Cook and State of Illinois, have invented new and useful Improvements in Automobile-Tire Locks, of which the following is a specification.

The device which is the subject matter of the present application for patent has been designed for locking spare tires carried by motor vehicles, and the object of the invention is to provide a very simple and highly efficient device for this purpose, the same being so applied to the tire that its theft or unauthorized removal from the tire carrier is effectually prevented.

The object stated is obtained by means of a novel combination and arrangement of parts to be hereinafter described and claimed, and in order that the same may be better understood, reference is had to the accompanying drawing forming a part of this specification.

In the drawing—

Figure 1 is an elevation of the device, partly in section; Fig. 2 is a cross section on the line 2—2 of Fig. 1, and Fig. 3 is a cross section on the line 3—3 of Fig. 2.

Referring specifically to the drawing, 5 denotes a band or other suitable flexible member which is permanently attached at one end to a lock casing 6, and has attached its other end a block 7 which is adapted to enter the casing from one end thereof, said end being open and the opposite end being closed. The first mentioned end of the band, together with a reinforcement 10, pass into the casing through a recess in the closed end thereof, and they are bent laterally to seat against the inner end wall of the opening 12 in which the block 7 seats, said bend ends being secured by screws 13. The other end of the band has a reinforcement 14 and these parts engage opposite faces of the block 7, and are secured by screws 15, the faces of the block being recessed as shown at 16, to seat the parts so that they come flush with the faces of the block.

In use, the band 5 is passed around the part to be locked or guarded against theft, and the block 7 is then inserted into the casing 6 and locked therein by a mechanism to be presently described. The device is well adapted for locking a spare tire to its carrier, where the latter is in the nature of a ring on which said tire is supported. The lock for the block 7 comprises the following parts:

The block 7 has a transverse recess in which are mounted two oppositely slidable bolts 17 which are adapted to be advanced to project from opposite sides of the block and to enter keeper apertures 18 in the adjacent side walls of the opening 12 in which the block seats. These bolts are operated by a key-actuated rotatable barrel 19 seating in a recess in one face of the block and having at its inner end a rocker arm 20 connected at its outer ends to the respective bolts 17 by links 21. It will therefore be seen that when the barrel 19 is rotated in one direction, the bolts 17 are retracted and withdrawn from the keeper apertures 18, so that the block 7 may now be removed from the casing 6 and the band 5 taken off the part around which it passes. The block 7 is locked in the casing 6 by advancing the bolts 17 into the keeper apertures 18.

The front face of the casing 6 has a keyhole 22 through which the key for operating the barrel 19 is inserted, and said key-hole is provided with a pivoted cover or guard plate 23.

I claim:

A locking device comprising a flexible member, a casing to which said member is secured at one end, a block to which the other end of said member is secured, said block being adapted to enter the casing, slidable bolts carried by the block and adapted to be projected from opposite sides thereof to enter keeper apertures in the casing, and a key-operated rotatable member carried by the block and operatively connected to the bolts for advancing and retracting the same, said member being housed in the casing when the block is inserted thereinto, and the casing having an aperture for entry of the key for operating said member.

In testimony whereof I affix my signature.

RAYMOND K. GRAY.